United States Patent
Gustafsson

[11] Patent Number: 5,999,683
[45] Date of Patent: Dec. 7, 1999

[54] CLIP DEVICE FOR CONDUITS CONTAINING OPTICAL FIBERS

[75] Inventor: Kjell-Ake Leif Gustafsson, Conklin, N.Y.

[73] Assignee: American Pipe & Plastics, Inc, Kirkwood, N.Y.

[21] Appl. No.: 09/108,604

[22] Filed: Jul. 1, 1998

[51] Int. Cl.[6] .................................................. G02B 6/00
[52] U.S. Cl. ......................... 385/136; 385/134; 385/138; 385/135
[58] Field of Search ..................................... 385/134–139

[56] References Cited

U.S. PATENT DOCUMENTS

| | | |
|---|---|---|
| 4,744,627 | 5/1988 | Chande et al. ........................ 385/136 |
| 5,146,532 | 9/1992 | Hodge ...................................... 385/136 |
| 5,710,855 | 1/1998 | Konwitz ................................... 385/135 |
| 5,732,180 | 3/1998 | Kaplan ..................................... 385/135 |

Primary Examiner—Phan T. H. Palmer
Attorney, Agent, or Firm—Charles J. Brown

[57] ABSTRACT

A clip device for holding together a plurality of spaced plastic conduits containing optical fibers wherein one-piece first and second cover members are assembled about the conduits with integral male connectors fitted within female slots in the respective cover members to hold them snugly together.

8 Claims, 1 Drawing Sheet

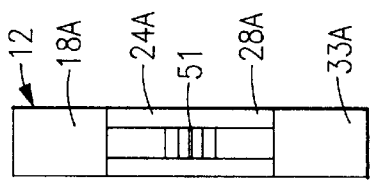
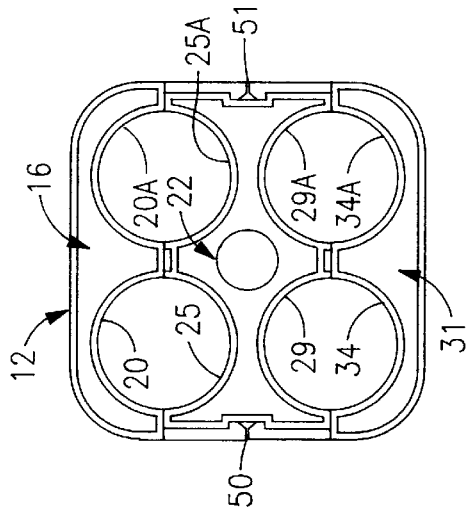
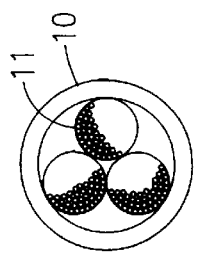
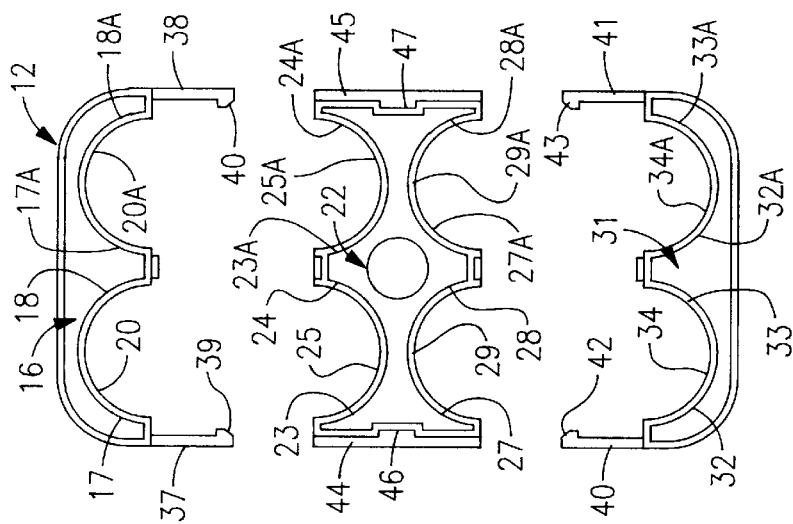
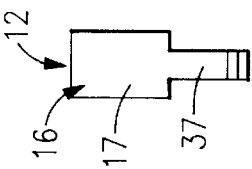

CLIP DEVICE FOR CONDUITS CONTAINING OPTICAL FIBERS

BACKGROUND OF THE INVENTION

This invention relates to plastic conduits within which a multiplicity of optical fibers are housed. More particularly, the invention concerns a clip device for holding the respective conduits apart from one another in a predetermined spaced relation within a fiber optic system. The clip device also facilitates appropriate branching of the conduits from one another.

Holding devices are known in the prior art for locating optical fibers themselves in spaced relation to one another, as opposed to holding apart in spaced relation separate conduits which contain optical fibers. U.S. Pat. Nos. 5,146,532 and 4,744,627 are typical of such prior art devices.

Devices for holding optical fibers as described in those prior patents are not well suited to the mounting of conduits containing optical fibers, principally in that they lack the simplicity required of holders for conduits of optical fibers. For example, in the optical fiber holder of U.S. Pat. No. 4,744,627, separate screws are relied upon to secure the parts of the assembly together. Such relatively complicated attachment means are avoided in U.S. Pat. No. 5,146,532 by the use of resilient strip members or keys which fit into corresponding keyways. However those systems are far from ideal for spacing conduits containing optical fibers because the grasped keys are not prevented from sliding laterally perpendicular to axis of movement into and out of their keyways.

It is a general purpose of the present invention to provide an improved clip device for conduits containing optical fibers in which one-piece male connectors and female slot-defining members interfit to hold the parts of the assembly closely together without the use of separate attachment means, and do so in a manner such that all substantial relative movement of each male connector in its associated female slot is prevented except movement into and out of engagement. No significant sideward back and forth movement perpendicular to that in and out movement is to be permitted between the male connectors and female slots as in the keys and keyways of certain of the prior art referred to above.

SUMMARY OF THE INVENTION

A clip device is provided for holding together in spaced relation a plurality of conduits containing optical fibers. The clip device of the invention comprises a unitary first cover member including at least one pair of spaced first side components defining therebetween a first concave seat within which one of the conduits is closely disposable. A unitary second cover member is also incorporated which includes at least one pair of spaced second side components defining therebetween a second concave seat within which the same conduit is closely disposable. The pairs of first and second side components engage one another end to end when the first and second cover members are assembled about the conduit. At least one male connector extends integrally from an outer edge of one of the first side components of the first cover member. A corresponding female slot is formed in an outer edge of one of the second side components of the second cover member to receive the male connector when the first and second cover members are assembled about the conduit. The male connector and associated female slot prevent all relative movement of the first and second cover members.

In a preferred form of the invention a pair of male connectors are provided on opposite outer edges of the first cover member and are associated with a pair of sidewardly open female slots on opposite outer edges of the second cover member. The first and second cover members may have a plurality of side components which define a plurality of side-by-side first and second concave seats within which a corresponding side-by-side plurality of respective conduits are closely disposable. Each male connector may include prong means at its extremity for positively engaging a recess in the associated female slot to prevent withdrawal of the male connector from the associated female slot. The first and second concave seats are preferably semi-circular. Each male connector may be spaced from one end of its associated slot to permit access to its prong means and displacement of the prong means manually from the associated recess for withdrawal of the male connector from the associated slot. Each male connector and female slot may be of rectangular cross section.

Two or more of the plastic conduits may be located side-by-side and also above others similarly positioned therebeneath. In that form the first and second cover members hold the upper first plastic conduits and the second cover member together with a third cover member holds the lower plastic conduits.

BRIEF DESCRIPTION OF THE DRAWINGS

FIG. 1 is an end view of one of the plastic conduits containing optical fibers which is to be held by the clip device of the invention;

FIG. 2 is an end view of one form of the clip device of the invention with three cover members shown exploded apart to be fitted about upper and lower pairs of plastic conduits;

FIG. 3 is a side view in exploded form of the cover members of FIG. 2;

FIG. 4 is an end view of the cover members of FIG. 2 brought together to hold the two upper and lower pairs of plastic conduits; and FIG. 5 is a side view of the assembled cover members of FIG. 4.

DESCRIPTION OF PREFERRED EMBODIMENT

Referring first to FIG. 1, a plastic conduit 10 of circular cross-section is shown which is filled with one or more cables of optical fibers 11. Each plastic conduit 10 may be of polyvinyl chloride and its diameter may be about 1.250 inches with a wall thickness of about 0.140 inches. The object of the invention is to provide a clip device for holding together in a predetermined fixed spaced relation a number of the conduits 10. In FIGS. 2 to 5 a clip device 12 is shown for holding four of them, two spaced upper conduits directly above two spaced lower conduits with all spacings both vertical and horizontal being equal.

The clip device 12, which may also be of polyvinyl chloride, includes a first cover member 16 in unitary form, which is to say manufactured in one piece and not as an assembly of discrete parts. The first cover member 16 includes a first pair of spaced first side components 17 and 18 defining between them a first concave seat 20 of semi-circular cross section. The first cover member 16 also includes a second pair of spaced first side components 17A and 18A defining between them another first concave seat 20A of semi-circular cross section. Each of the seats 20 and 20A is of a diameter substantially equal to the outside diameter of one of the conduits 10.

Also included is a unitary second cover member 22 which includes a first pair of spaced second side components 23 and 24 defining between them a second concave seat 25 which is also semi-circular. The second cover member 22 also includes a second pair of spaced side components 23A and 24A defining between them another second concave seat 25A of similar semi-circular cross section. Each of the seats 25 and 25A is of the same diameter as the seats 20 and 20A.

The second cover member 22 is also provided with a first pair of spaced third side components 27 and 28 defining between them a semi-circular third concave seat 29. The second cover member 22 also includes a second pair of spaced third side components 27A and 28A defining between them another third concave seat 29A. Each of the seats 29 and 29A is of the same diameter as the seats 20 and 20A and the seats 25 and 25A.

A unitary third cover member 31 is also provided which includes a first pair of spaced fourth side components 32 and 33 defining between them a fourth concave seat 34 and a second pair of spaced fourth side components 32A and 33A defining between them another fourth concave seat 34A. Each of the seats 34 and 34A is semi-circular and of the same diameter as the seats 20 and 20A, 25 and 25A and 29 and 29A.

When the clip device 12 is assembled to fit about four of the conduits 10 as shown in FIGS. 4 and 5, the outer ends of the pair of first side components 17 and 18 engage the outer ends of the pair of second side components 23 and 24 to form a circular seat. The outer ends of the other pair of first side components 17A and 18A engage the outer ends of the other pair of second side components 23A and 24A to form a second circular seat. Likewise the outer ends of the pair of third side components 27 and 28 engage the outer ends of the pair of fourth side components 32 and 33 to form another circular seat, and the outer ends of the other third side components 27A and 28A engage the outer ends of the other fourth side components 32A and 33A to form yet another circular seat.

As shown in the drawings, plastic may be conserved in forming the cover members 16, 22 and 31 by forming indentations around the edge portions of those parts and forming a non-functional hole in the center of the cover member 22.

Extending integrally from the extreme outer edge of the first side component 17 of the first cover member 16 is a male connector 37 of rectangular cross section. Similarly, on the other side of the first cover member 16 another male connector 38 of the same cross section extends from the extreme outer edge of the side component 18A. As shown in FIG. 3, the width of the male connectors 37 and 38 is narrower than the width of the side component, 17 and 18A from which they extend. At the lower ends of the male connectors 37 and 38 are respective integral prongs 39 and 40. The material and dimensions of the male connectors 37 and 38 are such that they are slightly resilient and during assembly of the clip device 12 they can bend somewhat outwardly from their vertical downward position shown in FIG. 2. On the third cover member 31 a similar pair of male connectors 40 and 41 with respective prongs 42 and 43 extend from the fourth side components 32 and 33A. They are similar to the male connectors 37 and 38 except that they project upwardly rather than downwardly.

Formed in the outer edges of the second side components 23 and 24A and third side components 27 and 28A of the second cover member 22 are respective slots 44 and 45. These slots 44 and 45 extend vertically through the outer edges of the second cover member 22 so that they open upwardly toward the male connectors 37 and 38 and downwardly toward the male connectors 40 and 41. At the center section of the slots 44 and 45 are respective recesses 46 and 47 most clearly visible in FIG. 2.

In the operation of the clip device 12 shown in FIGS. 3 to 5, the first cover member 16, the second cover member 22 and the third cover member 31 are initially detached from one another as shown in FIGS. 2 and 3. Four of the conduits 10, each filled with optical fibers 11, are to be held together by the clip device 12, two of the conduits 10 between the concave seats 20–25 and 20A–25A respectively and the other two of the conduits 10 between the concave seats 29–34 and 29A–34A respectively. When the four conduits 10 are properly located to fit into these various seats, the first cover member 16 and the second cover member 22 and also the second cover member 22 and the third cover member 31 are snapped together from the open position shown in FIGS. 2 and 3 to the closed position shown in FIGS. 4 and 5. In this snapping together the male connectors 37 and 38 bend outwardly very slightly and slide downwardly within the slots 44 and 45 until their respective prongs 39 and 40 snap into the upper ends of the recesses 46 and 47. Similarly, the male connectors 40 and 41 bend outwardly very slightly and slide upwardly in the slots 44 and 45 until their respective prongs 42 and 43 snap into the lower ends of the respective recesses 46 and 47. The male connectors 40 and 41 are also sufficiently resilient to bend outwardly as their prongs 42 and 43 move upwardly through the slots 44 and 45 toward the recesses 46 and 47. The dimensions of the male connectors 37–38 and 40–41 and the slots 44 and 45 are such that the cover members 16, 22 and 31 fit evenly together in the assembled clip device shown in FIGS. 4 and 5.

It will be noted particularly in FIGS. 4 and 5 that the axial length of the male connectors 37 and 38 and the male connectors 40 and 41 in relation to the axial length of the slots 44 and 45 is such that the ends of the male connectors do not come together. As shown in FIG. 4, a small space 50 is left between the opposed ends of the connectors 37 and 40 when they are assembled together and a small space 51 is left between the opposed ends of the connectors 38 and 41 when they are assembled together. The purpose of these spaces 50 and 51 is to permit disassembly of the clip device 12. The end of a screwdriver or knife may be inserted in the spaces 50 and 51 to permit one of the male connectors 37 and 38 or 40 and 41 to be bent outwardly until its associated prongs 39 and 40 or 42 and 43 is released from the associated recess 46 or 47, at which point the first cover member 16 or third cover member 31 can be pulled away from the second cover member 22.

The number of plastic conduits 10 to be held together by the clip device 12 of the invention can vary. There may be only two conduits 10 held together side by side in the seats 20–25 and 20A–25A, in which case the lower edge portion of the second cover member 22 is finished off straight similar to the lower edge portion of the third cover member 31 and the slots 44 and 45 and recesses 46 and 47 end part way down through the outer edges of that second cover member 22. There also may be only two conduits 10 held together one over the other, in which case the prongs 38 and 41 extend downwardly and upwardly respectively from the side components 18 and 33 rather than the side components 18A and 33A and the slot 45 with its recess 47 is located immediately alongside the side components 24 and 28 of the second cover member 22. In addition, there may be more than two plastic conduits 10 held together side by side and there may be more than two plastic conduits 10 held together one over the other, all achieved simply by increasing the number of concave seats formed horizontally and vertically in the clip device 12.

The scope of the invention is to be determined from the following claims rather than the foregoing description of a preferred embodiment.

I claim:

1. A clip device for holding together in spaced relation plastic conduits containing optical fibers comprising a) a unitary first cover member including at least one pair of spaced first side components defining therebetween a first concave seat within which one of the conduits is closely disposable, b) an unitary second cover member including at least one pair of spaced second side components defining therebetween a second concave seat within which said one of the conduits is closely disposable, c) the pairs of first and second side components engaging one another end to end when the first and second cover members are assembled about said one of the conduits, d) at least one male connector integrally extending from an outer edge of one of the first side components of the first cover member, and e) a corresponding female slot formed in an outer edge of one of the second side components of the second cover member for receiving said male connector when the first and second cover members are assembled about said one of the conduits, f) the male connector and associated female slot preventing relative movement of the first and second cover members.

2. A clip device according to claim 1 wherein a pair of male connectors on opposite outer edges of the first cover member are associated with a pair of sidewardly open female slots on opposite outer edges of the second cover member.

3. A clip device according to claim 2 wherein each male connector is spaced from one end of its associated slot to permit access to its prong means and displacement of said prong means manually from the associated recess for withdrawal of the male connector from the associated slot.

4. A clip device according to claim 2 wherein each male connector includes prong means at its extremity for positively engaging a recess in the associated female slot to prevent withdrawal of the male connector from the associated female slot.

5. A clip device according to claim 2 wherein the male connectors and female slots are of rectangular cross section.

6. A clip device according to claim 1 wherein the first and second cover members each have a plurality of side components which define a plurality of side-by-side first and second concave seats within which a corresponding side-by-side plurality of respective conduits are closely disposable.

7. A clip device according to claim 1 wherein the first and second concave seats are semi-circular.

8. A clip device for holding together in spaced relation a plurality of plastic conduits each containing optical fibers comprising a) a unitary plastic first cover member including at least two pairs of spaced first side components each pair thereof defining therebetween a first semi-circular concave seat within which one of the conduits is closely disposable, b) a unitary plastic second cover member including at least two pairs of spaced second side components each pair thereof defining therebetween a second semi-circular concave seat within which one of said conduits is closely disposable and at least two pairs of spaced third side components each pair thereof defining therebetween a third semi-circular concave seat within which one of said conduits is closely disposable, c) a unitary plastic third cover member including at least two pairs of spaced fourth side components each pair thereof defining therebetween a fourth semi-circular concave seat within which one of said conduits is closely disposable, d) the pairs of first and second side components and the pairs of third and fourth side components engaging one another respectively end to end when the first and second and third cover members are assembled about said conduits, e) respective pairs of male connectors of rectangular cross section integrally extending from outer edges of the first cover member and from outer edges of the third cover member, f) sidewardly open female slots of rectangular cross section formed in outer edges of the second cover member for receiving the respective male connectors when the cover members are assembled about the conduits, and g) prong means at the extremity of each male connector for positively engaging a recess in the associated female slot to prevent withdrawal of the male connector from the associated female slot, h) each male connector and associated female slot preventing all relative movement of the associated first and second and third cover members.

* * * * *